(12) United States Patent
Qandil et al.

(10) Patent No.: US 6,183,208 B1
(45) Date of Patent: Feb. 6, 2001

(54) IMMERSIBLE MOTOR SYSTEM

(75) Inventors: Mark M. Qandil; Robert B. Ray, both of Vancouver, WA (US)

(73) Assignee: Roper Holdings, Inc., Wilmington, DE (US)

(*) Notice: Under 35 U.S.C. 154(b), the term of this patent shall be extended for 0 days.

(21) Appl. No.: 09/493,822

(22) Filed: Jan. 28, 2000

Related U.S. Application Data

(63) Continuation-in-part of application No. 08/943,396, filed on Oct. 3, 1997, now Pat. No. 6,079,958.

(51) Int. Cl.⁷ ................................................ F04B 23/14
(52) U.S. Cl. .................... 417/201; 417/423.11; 417/63; 310/54
(58) Field of Search ........................... 417/201, 423.11, 417/9, 63; 310/54

(56) References Cited

U.S. PATENT DOCUMENTS

| | | | | |
|---|---|---|---|---|
| 2,005,429 | * | 6/1935 | Lichtenstein | 417/356 |
| 2,164,485 | * | 7/1939 | Yantis | 464/37 |
| 2,460,849 | * | 2/1949 | Senn | 416/240 |
| 2,687,249 | * | 8/1954 | Papanek et al. | 415/123 |
| 2,960,938 | * | 11/1960 | Williams | 417/356 |
| 2,991,051 | * | 7/1961 | Jones | 416/240 |
| 3,153,382 | * | 10/1964 | Blarcom, Jr. | 417/356 |
| 3,291,473 | * | 12/1966 | Sweeney et al. | 417/356 |
| 3,339,491 | * | 9/1967 | Malloch | 277/88 |
| 3,719,436 | * | 3/1973 | McFarlin | 417/356 |
| 3,746,472 | * | 7/1973 | Rupp | 417/9 |
| 3,839,863 | * | 10/1974 | Frazier | 60/327 |
| 4,521,151 | * | 6/1985 | Frater et al. | 415/131 |
| 4,566,855 | * | 1/1986 | Costabile et al. | 416/134 R |
| 4,838,763 | * | 6/1989 | Kramer et al. | 417/63 |
| 4,915,579 | * | 4/1990 | Whittier et al. | 415/171.1 |
| 4,930,986 | * | 6/1990 | Cooper | 416/189 |
| 5,011,166 | * | 4/1991 | Watts | 277/88 |
| 5,101,128 | * | 3/1992 | Veronesi et al. | 310/54 |
| 5,447,078 | * | 9/1995 | Robinson, Jr. et al. | 74/606 R |
| 5,490,768 | * | 2/1996 | Veronesi et al. | 417/356 |
| 5,499,902 | * | 3/1996 | Rockwood | 415/113 |
| 5,622,481 | * | 4/1997 | Thut | 417/319 |
| 5,642,986 | * | 7/1997 | Rose | 416/402 |
| 5,713,727 | * | 2/1998 | Veronesi et al. | 417/356 |
| 5,855,472 | * | 1/1999 | Ravitts | 417/421 |

* cited by examiner

Primary Examiner—Charles G. Freay
Assistant Examiner—Robert Z. Evora
(74) Attorney, Agent, or Firm—Kolisch, Hartwell, Dickinson, McCorrmack & Heuser

(57) ABSTRACT

A motor system using a totally enclosed fan-cooled (TEFC) electric motor to provide power. The motor enclosure may be sealed with a variety of sealing devices, including a double mechanical seal a single mechanical seal, a double lip seal injected with grease, a labyrinth seal, and/or a repeller positioned adjacent the motor enclosure. A release mechanism prevents the fan from creating excessive drag when the system is immersed in water. The fan cools the motor when the water level is below the motor, and the surrounding water combines with the fan to cool the motor when the water level rises to at least partially surround the motor. When the fan is at least partially immersed, the release mechanism substantially prevents the fan from imposing a load on the motor due to the surrounding water. The release mechanism can take the form of a shear key, a torque-release clutch or flexible fan blades. Alternatively, a separate fan motor may be provided for driving the cooling fan. Where a separate fan is provided, a switching mechanism may be provided to turn off the fan motor when the motor system is at least partially immersed.

31 Claims, 5 Drawing Sheets

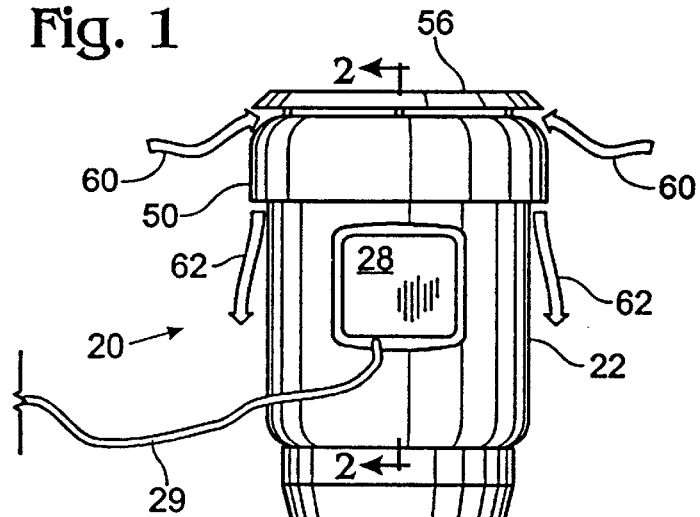
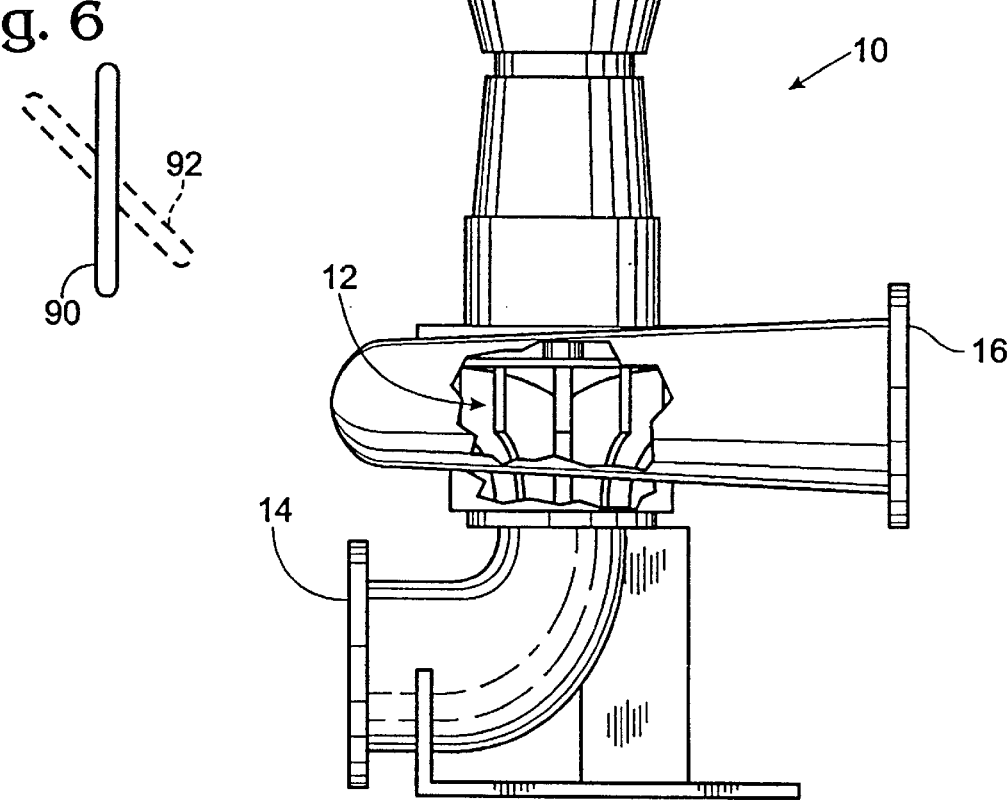
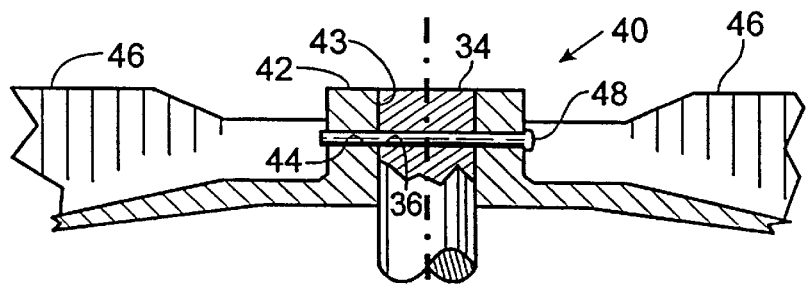

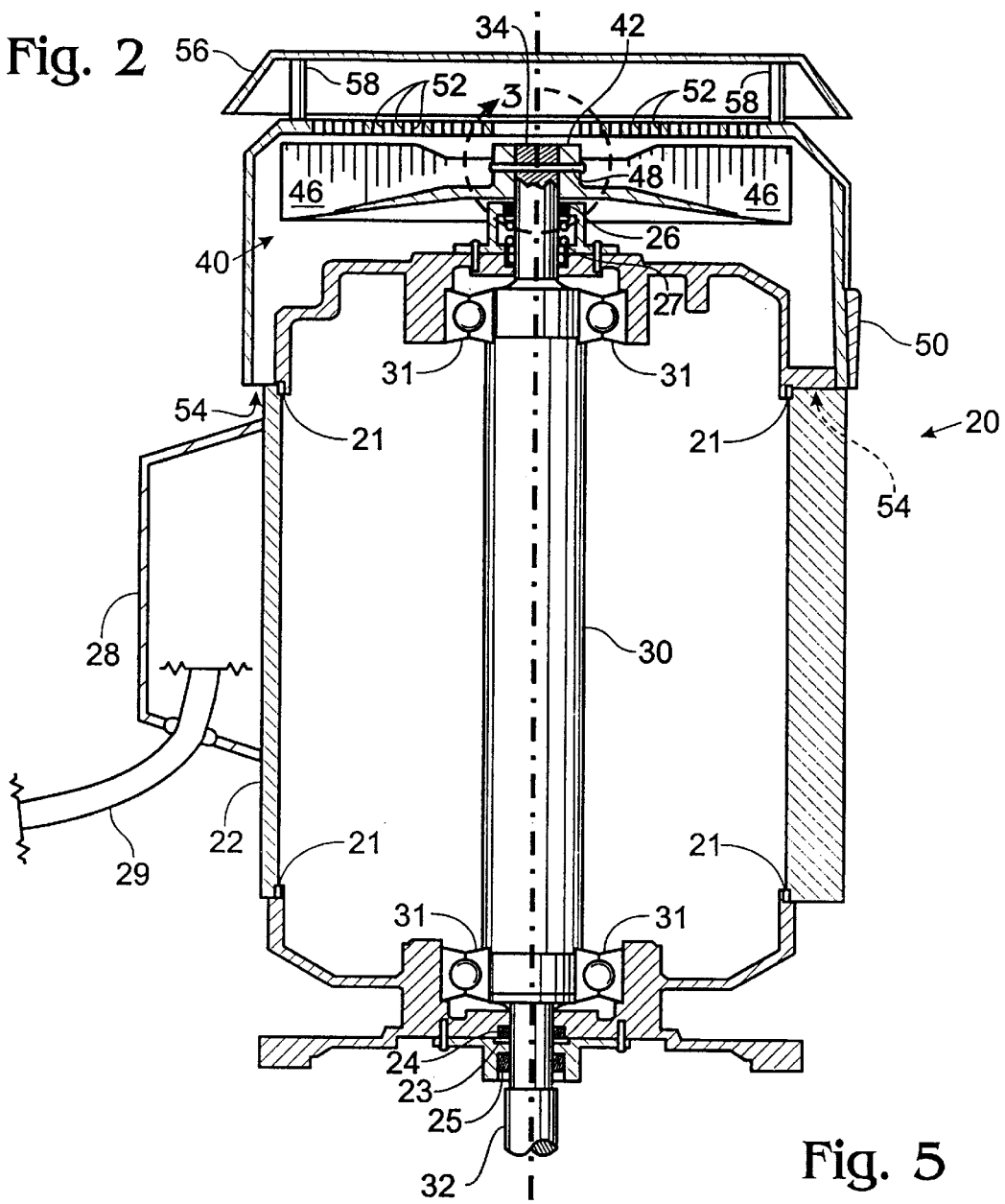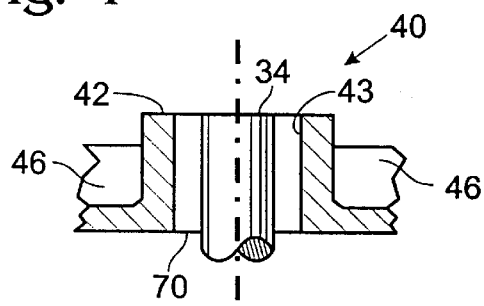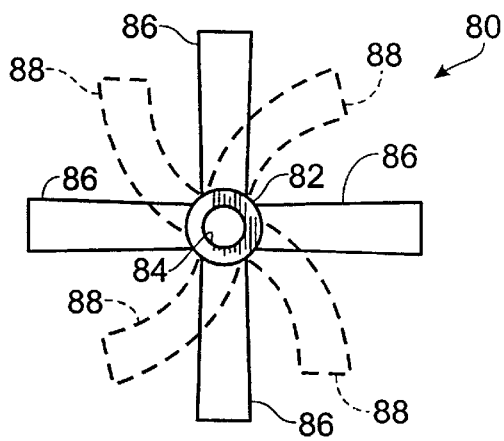

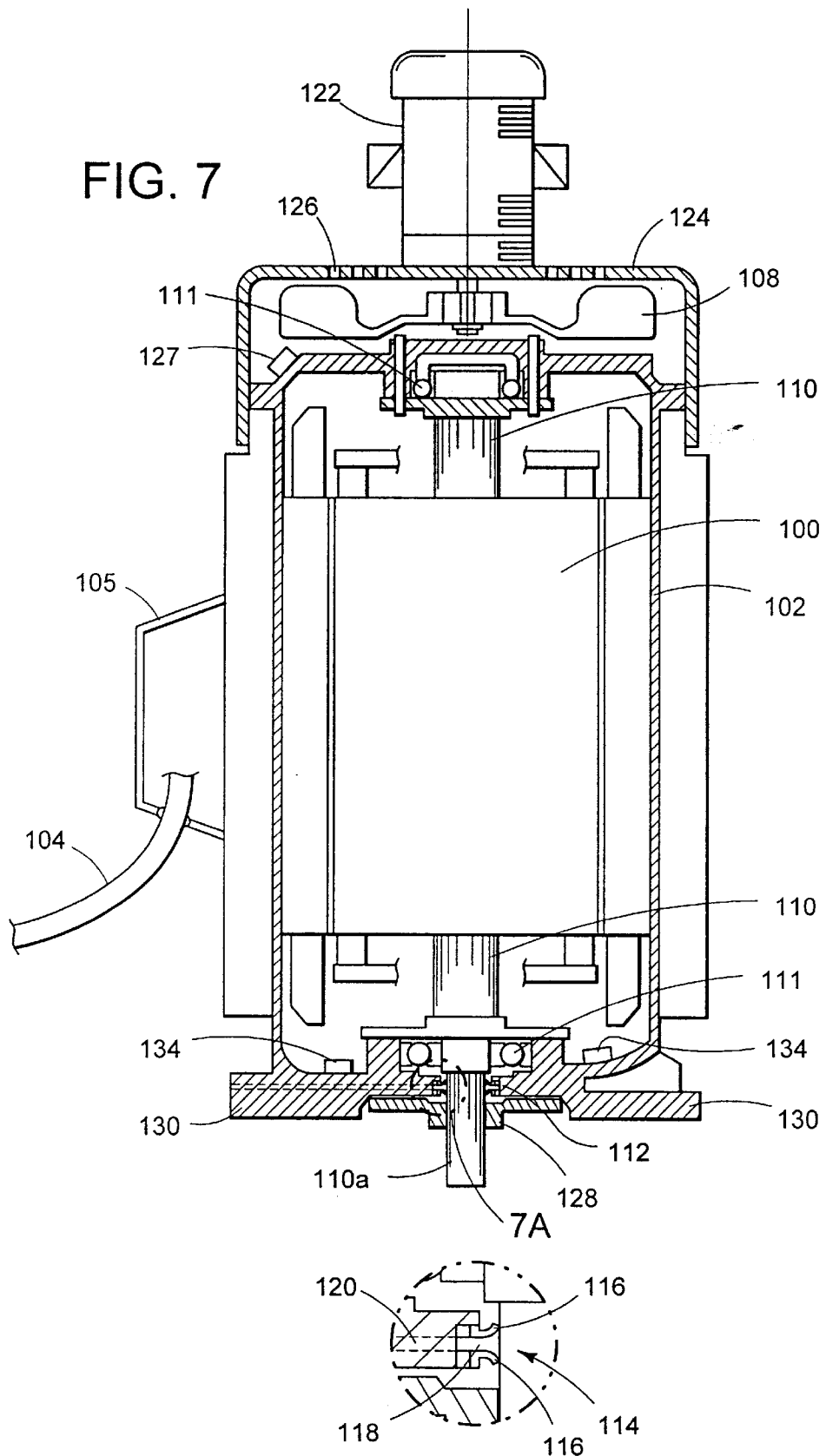

IMMERSIBLE MOTOR SYSTEM

CROSS REFERENCE TO RELATED APPLICATION

This is a continuation-in-part of application Ser. No. 08/943,396 filed Oct. 3, 1997, U.S. Pat. No. 6,079,958, for a DRY-PIT SUBMERSIBLE PUMP HAVING A FAN AND A TORQUE-RELIEVING MECHANISM. The subject matter of that application is incorporated herein by this reference.

BACKGROUND OF THE INVENTION

This invention is related to the field of motors. More particularly, this invention is related to the field of immersible motor systems that may be operated both in an immersed and in a non-immersed condition.

Broadly speaking, motor systems can be classified into two types: nonimmersible and immersible. Immersible motors systems are used in applications where both the motor and the device being driven by the motor must be placed in water or some other liquid. For example, in pumping applications involving deep wells, it is usually necessary to locate the pump and motor at the bottom of the well and "push" water up because it is not possible to pull water up from a depth greater than approximately 30 feet. While motors for applications involving immersion can be made rather compact because of the efficient cooling provided by the surrounding water, they are relatively expensive to manufacture and therefore only used where absolutely necessary.

Non-immersible motor systems, in contrast to immersible systems, have motors designed to operate in air, and are used wherever the motor is not subject to being immersed in water. Because air is a much less effective cooling medium than water, non-immersible systems are typically equipped with a fan for generating a stream of cooling air over the outside of the motor.

A particularly common type of motor used to provide power in nonimmersible or dry motor systems is known as a totally-enclosed, fan-cooled, or TEFC, motor. In a TEFC motor, the casing forms a sealed container around the motor armature to seal against contamination. As a result of this sealing, TEFC motors are substantially waterproof, and may even be partially immersed for short periods of time while idle. However, if a TEFC motor is operated under water, water would leak into the housing and the cooling fan would generate so much increased drag relative to operation in air that the motor would become overloaded and burn out. Thus, existing TEFC motors have not been suitable for operation, even temporarily, under water.

In some applications, the motor system is normally expected to operate in air, but may under some circumstances become immersed for periods of time. For example, a pumping station may become inundated during a flood, or a sump pump may fail to keep up with influx to a sump pit. In these and various other settings, it is important that the pump or other device driven by the motor continues to operate in the event of immersion. In such cases, an immersible motor system has been used and simply operated in air under normal circumstances. However, because the air cannot cool the motor as effectively as water, some additional provision must be made to cool the motor. For instance, the motor may be oversized and run at less than rated capacity to thereby provide additional surface area to enhance cooling. In some cases a cooling jacket is used to circulate pumpage or oil around the motor. Unfortunately, these systems for cooling add significantly to the expense of a motor that is already more expensive than a comparable non-immersible motor. By way of example, an immersible motor system designed to operate in air may be more than three times as expensive as a comparable non-immersible system.

In addition to these problems associated with cooling of the motor, existing TEFC motor systems often do not provide adequate protection against moisture entering the motor enclosure. First, the conventional seals employed in TEFC motors do not provide adequate sealing for the wide range of operating conditions under which immersible systems operate. Typically, TEFC motor systems do not employ any backup seal to provide additional protection in the event that the primary seal fails. In addition, in conventional TEFC systems, the operator is not informed when leakage does occur, and the motor will continue to operate even in the presence of potentially damaging moisture within the motor enclosure. Also, the junction box in a conventional TEFC system is not sealed, nor are the fits in the motor casing.

BRIEF DESCRIPTION OF THE DRAWINGS

FIG. 1 is a side view of a fan-cooled dry-pit immersible pump according to the present invention.

FIG. 2 is a sectional view of one embodiment of the immersible motor system of the present invention.

FIG. 3 is a sectional view of the motor-fan connection according to one embodiment of the present invention.

FIG. 4 is a sectional view of the motor-fan connection according to another embodiment of the present invention.

FIG. 5 is a top view of a fan according to yet another embodiment of the present invention.

FIG. 6 is an end view of a fan blade according to yet another embodiment of the present invention.

FIG. 7 is a sectional view of another embodiment of an immersible motor system according to the present invention.

FIG. 7A is a partial expanded view of the immersible motor system of FIG. 7, showing one embodiment of a seal between the motor shaft and housing.

DETAILED DESCRIPTION OF THE PREFERRED EMBODIMENT

Figure 7B:
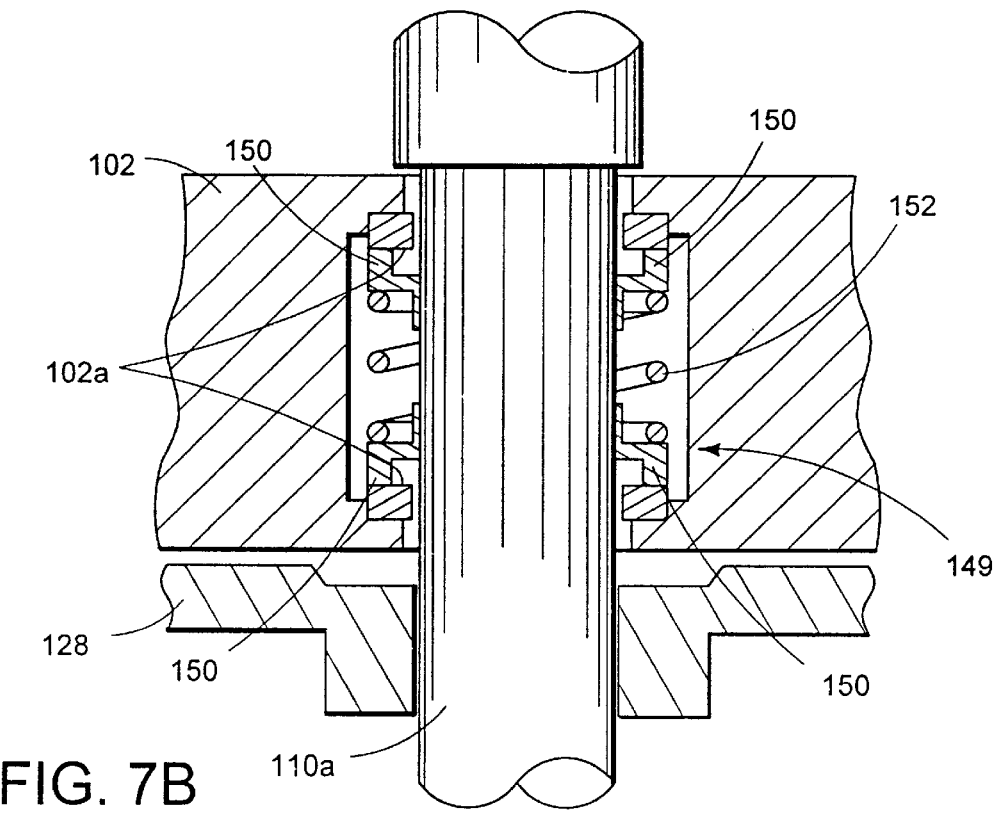
FIG. 7B is a partial expanded view of an immersible motor system, showing another embodiment of a seal between the motor shaft and housing.

The present invention relates generally to motor systems, and particularly to motor systems that may be operated in both an immersed and a non-immersed condition. The disclosed motor system may be used in any number of applications to power a wide variety of devices, and is described in the context of an immersible pump system for purposes of illustration only.

A fan-cooled dry-pit immersible pump employing an immersible motor system according to the present invention is shown generally at 10 in FIG. 1. Pump 10 includes an impeller 12 which moves water or other liquid from an inlet 14 through an outlet 16. Impeller 12 is driven by electric motor 20, which is preferably a substantially standard TEFC motor with modifications as described below. Other types of motors could be used as well provided they are capable of operation in an immersed condition.

Motor 20 is enclosed in a substantially waterproof casing 22 which allows motor 20 to continue to operate when surrounded by water. In addition to the standard TEFC motor seals, motor 20 is further protected by O-rings 21 and 23, lip seals 24, 25, 26, and mechanical seal 27. A watertight, immersible junction or conduit box 28 is attached to casing 22. Immersible cable 29 is connected to conduit box 28 and enables motor 22 to be safely powered in an immersed state. Alternatively, an immersible power cable may be provided to extend directly into the housing through a sealed opening, eliminating the need for a watertight conduit box. Power from motor 22 is output through a drive shaft 30, which is rotatable with respect to casing 22 via bearings 31. First end 32 of shaft 30 is operationally connected to impeller 12. A second end 34 of shaft 30 extends outside of casing 22 and contains a shaft bore 36 which is orthogonal to the normal axis of rotation of shaft 30.

Typically, a cooling fan 40 is disposed above casing 22. In one embodiment, fan 40 has a plurality of blades 46 designed to direct air to cool motor 20. Alternatively, fan 40 could have as few as one blade. As shown in detail in FIG. 3, base 42 of fan 40 has a central bore 43 which is of sufficient diameter to be loosely mounted on second end 34 of shaft 30. A fan bore 44 is provided at least partially through base 42. Fan bore 44 has a diameter similar to the diameter of shaft bore 36. Fan 40 is placed on shaft 30 so that shaft bore 36 and fan bore 44 are coaxially aligned with respect to each other. A shear key or shear pin 48 is inserted through shaft bore 36 and fan bore 44. Shear key 48 comprises a torque-transferring connection between shaft 30 and fan 40. Shear key 48 can be made of any suitable material, such as plastic or metal. A fan housing 50 is situated on one end of casing 22 and surrounds fan 40. Vent holes 52 are disposed at the top of fan housing 50. An annular passage 54 is created between fan housing 50 and casing 22. A shroud 56 is attached to fan housing 50 by bolts or posts 58. Shroud 56 helps direct air to fan 40. Shroud 56 protects fan 40 from damage due to solid objects falling into the fan during operation.

When motor 20 is operated in a non-immersed condition, shaft 30 drives fan 40. Fan 40 draws air into shroud 56 and through vent holes 52 as shown by arrows 60 in FIG. 1. The air is directed by blades 46 through annular passage 54 and along the outside of casing 22 as shown by arrows 62 in FIG. 1 to cool the motor.

Because motor 20 is substantially completely sealed inside casing 22 and electrically sealed due to immersible conduit box 28, motor 20 will continue to operate without electrical shorting when the level of the surrounding water rises to partially immerse motor 20. In a partially immersed state, fan 40 continues to be driven by motor 20. Motor 20 is thereby cooled both by the air directed by fan 40 and by the surrounding water.

When the water level reaches fan 40, the drag created by blades 46 as they rotate in the water causes shear key 48 to break. When shear key 48 breaks, there is no torque-transferring connection between motor 20 and fan 40, and fan 40 ceases to be powered by motor 20. As the water level recedes, an operator can temporarily shut off motor 20 and quickly replace shear key 48.

It is within the scope of the present invention to include any immersible fan-cooled electric motor having a connection or arrangement whereby a load due to the fan rotating in water is reduced or eliminated. By way of example, FIG. 4 shows an alternate embodiment of the present invention wherein a torque-release clutch 70, shown schematically, is disposed between shaft 34 and central bore 43 of fan 40. Clutch 70 provides a torque-transferring connection between motor 20 and fan 40 when fan 40 is operating in air. Clutch 70 is designed to release the connection when a predetermined torque load is placed upon motor 20 due to fan 40 resisting rotation. Alternatively, clutch 70 can be designed to limit the torque to a predetermined maximum to thereby prevent overloading.

In a further embodiment of the present invention shown in FIG. 5, the torque-reducing arrangement may also take the form of a fan 80 having a base 82 and a central bore 84 which is non-rotatably fastened to second end 34 of shaft 30. Flexible blades 86 are attached to base 82 and are formed of a bendable, resilient material. When flexible blades 86 are rotated in water, flexible blades 86 bend as shown at 88. Flexible blades 86 thus reduce the load on motor 20 when flexible blades 86 rotate in water. Alternatively, the fan blades may be designed so that the pitch of the blades may change when rotated in water. FIG. 6 is an end view of a fan blade 90, which when subjected to a predetermined load will bend as shown at 92 so that the pitch of blade 90 is changed. This change in pitch of blade 90 reduces the load on motor 20 due to blade 90 rotating in water.

Instead of a torque-relieving mechanism operationally connected between the fan and motor to prevent the pump motor from overloading, a separate motor may be used to drive the fan, as shown in FIG. 7. As in the previous embodiments, a main motor 100 is disposed within a sealed housing 102. Motor 100 is typically an electric motor, with electricity being supplied to the motor through an immersible power cable 104 connected to an immersible conduit box 105 attached to the exterior of sealed housing 102.

Similar to the previous embodiments, a cooling fan 108 may be positioned adjacent the exterior of sealed housing 102, the fan being adapted to generate a stream of cooling air for cooling motor 100. However, the depicted fan differs from those shown in the earlier embodiments in that it is not powered by the main motor. Accordingly, motor shaft 110 does not extend out the top of sealed housing 102 for attachment to the cooling fan, as in the previous embodiments. As a result, only one shaft opening 112 need be formed through sealed housing 102. The opening is formed in a bottom portion of the sealed housing, and motor shaft 110 extends through this opening for attachment to an impeller or other device to be driven by motor 100. Bearings 111 are provided at opposite ends of sealed housing 102 to rotatably support motor shaft 110.

Because there is only one shaft opening in sealed housing 102, the depicted design will, in some settings, provide increased protection against moisture entering the sealed housing. As shown in FIG. 7A, the motor shaft and housing are sealed at shaft opening 112 with a double lip seal 114 injected with grease, which may or may not be maintained under pressure. Lip seals 116 are typically annular and formed of an elastomeric material. Lip seals 116 are mounted or otherwise fixed to the portion of sealed housing 102 immediately adjacent motor shaft 110 and shaft opening 112. The seals are positioned around the shaft opening to bear snugly against motor shaft 110 and define a cavity 118 therebetween that extends around motor shaft 110. A grease injection channel 120 is defined through the sealed housing 102 to communicate with cavity 118. Grease (not shown) is injected through grease injection channel 120 to fill cavity 118. The grease provides lubrication and is preferably maintained under pressure to urge lip seals 116 against shaft 110 in order to increase the effectiveness of the seal. The pressure may be maintained by a spring-loaded grease cup or other type of constant lubrication device.

Figure 7C:
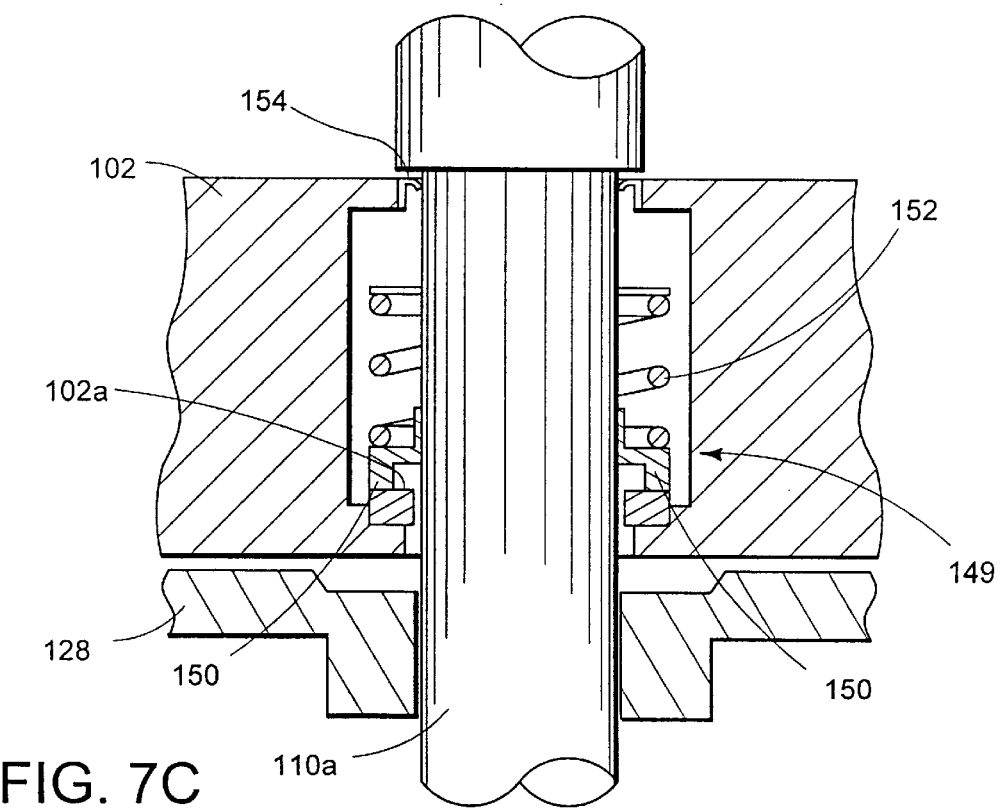
FIG. 7C is a partial expanded view of an immersible motor system showing yet another embodiment of a seal between the motor shaft and housing.

As shown in FIGS. 7B and 7C, sealing between the shaft and housing may be effected using either a single or double mechanical seal. Typically, the depicted mechanical seals are used in place of the lip seal arrangement shown in FIGS. 7 and 7A, however mechanical seals may be used in combination with the described double lip seal, or in combination with any other type of seal.

FIG. 7B depicts a double mechanical seal for sealing between the motor shaft and housing, the seal including a pair of rotating faces 150 and a spring 152. Rotating faces 150 are annular and fixed to shaft portion 110a so that the faces rotate with the shaft but are able to slide vertically along the length of the shaft. Spring 152 is disposed between rotating faces 150, urging them away from each other and into engagement with face portions 102a defined on housing 102. This creates a sealed interface between rotating faces 150 and face portions 102a that prevents moisture and other contamination from entering the interior of housing 102 along the shaft through the shaft opening. Typically, a circulating oil or other lubrication system is provided to lubricate double mechanical seal 149, and particularly to lubricate the rotating interface between rotating faces 150 and face portions 102a. Where a circulating oil system is employed, an oil reservoir (not shown) is fluidly coupled with the double mechanical seal via oil inlet and outlet ports (not shown) defined in housing 102.

FIG. 7C depicts a single mechanical seal 153 for sealing between the shaft and motor housing, the seal including only one rotating face 150. As with the double mechanical seal, a spring 152 is provided to urge the rotating face into engagement with a face portion 102a included on housing 102 in order to effect a rotating sealing interface. The upper end of the spring engages a spring retainer 155 that is fixed to shaft portion 110a. In the depicted embodiment, a single lip seal 154 is provided adjacent the upper portion of spring 152 to provide additional sealing. As with the double mechanical seal, a lubrication system may be provided to lubricate single mechanical seal 153.

Referring again to FIG. 7, cooling fan 108 is positioned atop the sealed motor housing, and typically includes a plurality of blades that are adapted and positioned to generate a cooling stream of air when the fan rotates. Though the depicted fan is positioned atop the motor housing, the fan may be positioned at any other desired location adjacent the exterior of the housing. A separate motor, such as electric fan motor 122, may be provided to drive cooling fan 108. Typically, cooling fan 108 is situated within a shroud 124 secured to the top of sealed housing 102, with fan motor 122 being secured to the top of the shroud. Alternatively, the shroud may be formed to cover both the cooling fan and the fan motor. Shroud 124 is provided with vents 126 on the top of the shroud and additional vents (not shown) below the level of fan 108 to allow air to circulate within the cavity defined by the shroud and sealed housing in order to cool motor 100.

As with the previous embodiments, it is generally not desirable for the fan and fan motor to continue operating when the system is immersed. When the system is immersed, the liquid surrounding the sealed housing generally provides adequate cooling, and the increased drag on the fan motor as a result of the fan running in water may overload and damage the fan motor. Accordingly, a switching device such as float switch 127 may be provided to shut off the fan motor when the system is operated in an immersed state. Alternatively, a fuse or breaker may be provided in the fan motor's electrical circuit. When the fan is immersed, the increased drag causes the motor to draw more current, and the fuse or breaker shuts off the motor when the current exceeds a predetermined threshold. As a further alternative, a moisture-sensing switch or any other suitable means may be used to cause the fan motor to shut off when the system is immersed. Similar to the torque-reducing arrangement of the previous embodiments, the shut-off capability eliminates unnecessary and potentially dangerous fan drag while allowing the pump or other device driven by the motor to continue to operate in an immersed condition. Because it is normally not desirable for the fan to continue operating while immersed, fan motor 122 does not need to be provided with seals which allow immersed operation. This saves on manufacturing costs. However, a waterproof motor may be used, i.e., a motor that is not damaged by total immersion and that can resume operating after withdrawn from a immersed state.

As a further alternative to avoid problems resulting from excessive drag created by the cooling fan, the fan may have a preselected size specifically chosen to create minimal drag when the fan is operated in an immersed state. Typically, the smaller the fan blades, the lower the drag created by the fan when operated underwater. Yet another alternative is to drive the fan with a motor able to handle increased torque drag without drawing an excessively increased, potentially damaging level of current.

Instead of a fan mounted adjacent the motor housing, the invented immersible motor system may be cooled with a remotely-mounted fan. For example, a cooling stream of air may be supplied by a fan through an air duct. As a further alternate cooling means, the motor may be supplied with a cooling jacket to circulate oil or some other cooling fluid around the motor. Yet another alternative is to provide an oversized motor, i.e. a motor with excess surface area, and run the motor at less than maximum capacity. At these lower power levels, the relatively large amount of motor casing surface area provides effective cooling without the need for a fan.

To further seal housing 102, a rotating or centrifugal sealing device, such as a repeller, may be provided. This type of sealing device may used both with immersible and non-immersible motor systems. In the embodiment depicted in FIG. 7, the rotating centrifugal sealing device takes the form of a hydrodynamic seal 128. Typically, hydrodynamic seal 128 is disc-shaped and is press-fitted or otherwise fixed to outer shaft portion 110a so that the hydrodynamic seal is positioned at a close clearance to the exterior of sealed housing 102 adjacent shaft opening 112. A cavity or depression may be formed on the outer surface of sealed housing 102 around opening 112 in order to accommodate the hydrodynamic seal. The depicted sealed housing is provided with such a cavity, the cavity being defined by a protrusion 130 that extends from the outer surface of the sealed housing and is perimetrically disposed around shaft opening 112. Alternatively, the cavity may be formed by cutting a depression into, or forming an indentation in the surface of the sealed housing, or the sealed housing may be formed to not have any cavity or depression.

Hydrodynamic seal 128 is preferably positioned near, and in operative proximity with the opening of the sealed housing so that there is a close clearance between the hydrodynamic seal and the exterior surface of the housing. As motor shaft 110 rotates, hydrodynamic seal 128 also rotates, and thereby repels fluid away from the center of hydrodynamic seal 128, and away from shaft opening 112. The rotation of hydrodynamic seal 128 also creates a region of low pressure relative to the interior of housing 102. The repelling action and pressure differential resulting from the rotation of hydrodynamic seal 128 prevents fluid and other matter from entering housing 102 through opening 112 along the shaft.

Figure 8:
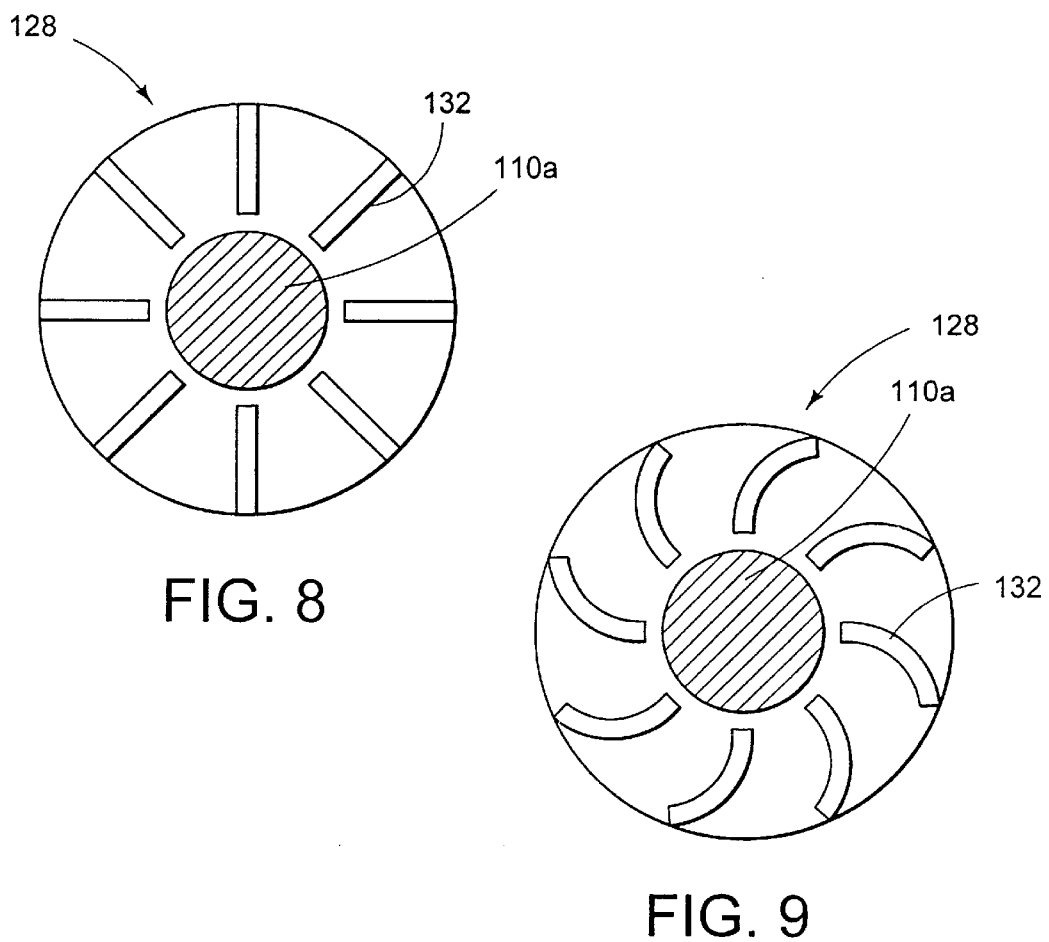
FIG. 8 is a top view of one embodiment of a rotating/centrifugal sealing device according to the present invention.
Figure 9:
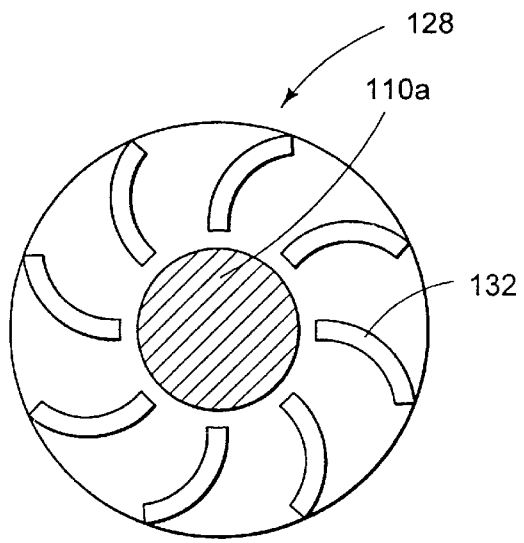
FIG. 9 is a top view of another embodiment of a rotating/centrifugal sealing device according to the present invention.

Hydrodynamic seal 128 typically includes at least one, and preferably several, vane(s) or similar structure(s) located on the side of the seal that faces the exterior of sealed housing 102, though these structures are not essential. For example, the hydrodynamic seal may be formed as a smooth disc positioned at a close clearance to the exterior of the motor housing. FIGS. 8 and 9 depict embodiments of a hydrodynamic seal having vanes 132, and reveal that the vanes may be curved or radial and straight. Alteratively, the vanes may be formed in any shape, size and orientation in order to provide a desired pressure differential and level of repelling action when shaft 110 and hydrodynamic seal 128 rotate. Hydrodynamic seal 128 is inexpensive and easy to manufacture, and provides added protection against contamination while imposing a negligible additional torque load on motor 100.

Typically, the rotating/centrifugal sealing device is used to hydrodynamically seal an immersible motor system, such as the motor system used with the immersible pump described above. When such an immersible system is operated in an at least partially immersed state, the hydrodynamic seal prevents fluid from leaking into the motor housing and damaging the motor. However, the invented rotating/centrifugal sealing device also affords protection to a motor system operating in a non-immersed state, and may be incorporated into motor systems that are never immersed. For example, such a seal may be used with wash-down duty motors or TEFC motors that may be sprayed with water while operating. More generally, the rotating/centrifugal sealing device may be advantageously used to effect a seal between a rotating shaft and an opening in a housing on any system that operates in a wet environment.

To further protect the motor against damage from moisture, the interior of sealed housing 102 may be provided with moisture detectors 134. The moisture detectors are operable to detect when moisture within the sealed housing exceeds a predetermined threshold. When the threshold is exceeded, a warning indicator may be activated to inform the operator that the motor system should be de-activated and repaired. Additionally, the moisture detectors may be connected to an automatic switch which shuts off the motor when moisture within the housing reaches potentially dangerous levels.

Figure 10:
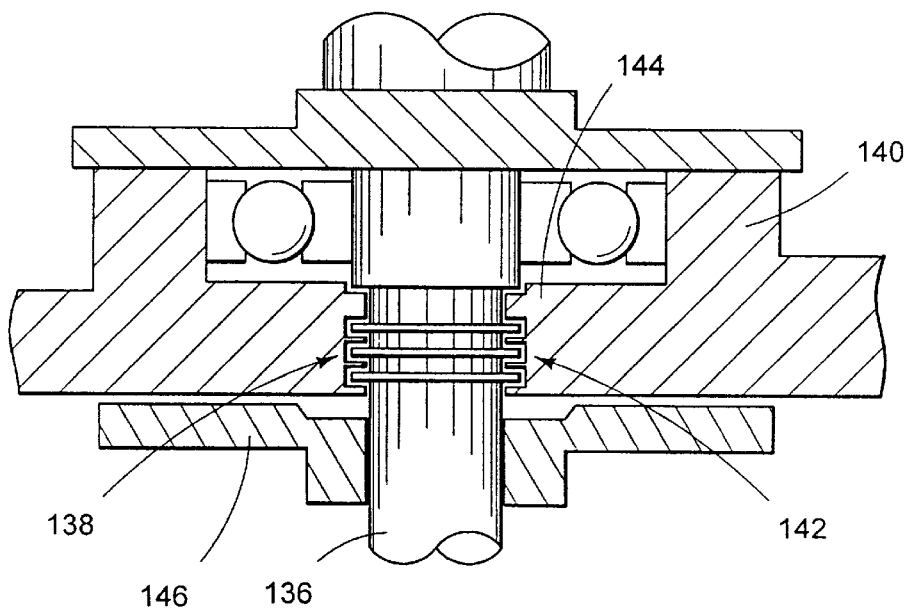
FIG. 10 is a partial sectional view of yet another embodiment of an immersible motor system according to the present invention.

FIG. 10 depicts a further embodiment of an immersible motor system. As in the embodiment described with reference to FIG. 7, a motor shaft 136 extends out an opening 138 in sealed housing 140. However, in this embodiment, opening 138 is sealed with a labyrinth seal 142 and a rotating/centrifugal sealing device 146 of the type described with reference to FIGS. 7–9. As revealed by the depicted embodiment, the exterior surface of the sealed housing need not be formed to have a cavity or depression for accommodating the sealing device. Rather, the exterior surface of the housing adjacent the shaft opening may be formed to be generally planar and without any protruding structures, in order to simplify the design and manufacture of the sealed motor housing.

The sealing devices depicted in FIGS. 7–10, namely a mechanical seal (single or double) with an oil bath, a double lip seal injected with grease, a labyrinth seal, and a rotating/centrifugal sealing device positioned adjacent the shaft opening, may be employed in a variety of configurations beyond those shown in the depicted embodiments. For example, a double lip seal, mechanical seal, and rotating/centrifugal sealing device could be used, with the mechanical seal being positioned between the rotating/centrifugal sealing device and the double lip seal, or with the double lip seal being positioned between the mechanical seal and the rotating/centrifugal sealing device. Regardless of the configuration used, the sealing devices described with reference to FIGS. 7–10 offer improved protection beyond the seals employed in conventional TEFC and immersible motor systems.

As discussed above, the invented motor system has proven particularly useful in systems that are subject to immersion. However, the cooling, torque-limiting, sealing and other design considerations discussed above are often factors in the design of non-immersible systems, and the principles of the invention are therefore equally applicable to those systems. For example, the various sealing mechanisms described above may be used on non-immersible systems that operate in a wet environment or that are periodically exposed to splashing water. The rotating/centrifugal sealing device may be used to protect wash-down duty motors and TEFC motors subject to splashing, and may be used more generally to prevent contaminants from entering a motor housing. In addition, the torque-limiting arrangements may be employed in non-immersible motor systems to protect the main motor, or auxiliary motors such as a cooling fan motor, from overloading.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others tilled in the art to best utilize the invention in various embodiments and with various modifications as are suited to the particular use contemplated. It is intended that the scope of the invention be defined by the claims appended hereto.

What is claimed is:

1. An immersible motor system comprising:
    a main motor including an armature enclosed within an armature housing and a rotatable shaft that extends out of the armature housing through an opening in the armature housing;
    a seal for scaling between the armature housing and the rotatable shaft at the opening so that the immersible motor system is operable in an immersed condition and a non-immersed condition, the seal being selected from the group consisting of: a double mechanical seal, a single mechanical seal, a double lip seal injected with grease, and a labyrinth seal; and
    a cooling fan rotationally mounted outside the armature housing and adapted so that, when rotated, the cooling fan creates an airflow for cooling the main motor.

2. The immersible motor system of claim 1, further comprising a torque-limiting device to avoid excessive drag created by the cooling fan when the immersible motor system is operated in an at least partially immersed condition.

3. The immersible motor system of claim 2, further comprising a fan motor operationally connected to the cooling fan for driving the cooling fan.

4. The immersible motor system of claim 3, wherein the torque-limiting device includes a switching device adapted to shut off the fan motor when the motor system is operated in an at least partially immersed condition.

5. The immersible motor system of claim 4, wherein the switching device is further adapted to cause the fan motor to turn on when the immersible motor system is operated in a non-immersed condition.

6. The immersible motor system of claim 2, wherein the cooling fan is operationally connected to the main motor, and wherein the torque-limiting device includes a shear key operationally connected between the cooling fan and the main motor.

7. The immersible motor system of claim 2, wherein the cooling fan is operationally connected to the main motor, and wherein the torque-limiting device includes a clutch operationally connected between the cooling fan and the main motor.

8. The immersible motor system of claim 2, wherein the cooling fan includes a fan blade made of a resilient material, the fan blade comprising the torque-limiting device.

9. The immersible motor system of claim 1, further comprising a pump impeller operationally connected to the rotatable shaft.

10. The immersible motor system of claim 1, further comprising a repeller mounted to the rotatable shaft outside the armature housing and near the opening, the repeller being adapted so that, when rotated, the repeller repels fluid and other contaminants to prevent contamination from entering into the armature housing through the opening.

11. The immersible motor system of claim 1, further comprising at least one moisture detector disposed within the armature housing, the moisture detector adapted to detect when moisture within the armature housing exceeds a predetermined threshold.

12. The immersible motor system of claim 1, further comprising a watertight junction box for supplying power to the main motor.

13. The immersible motor system of claim 1, wherein the motor is substantially a totally-enclosed, fan-cooled motor, and wherein the armature housing includes at least one watertight compartment.

14. The immersible motor system of claim 1, wherein the fan has a preselected size, the preselected size being small enough so that the fan does not create excessive drag when the immersible motor system is operated in an immersed condition.

15. A motor system, comprising:
   a main motor including an armature enclosed within an armature housing and a rotatable shaft that extends out of the armature housing through an opening in the armature housing; and
   a repeller mounted to the rotatable shaft outside the armature housing and near the opening, the repeller being adapted so that, when rotated, the repeller repels fluid and other contaminants to prevent contamination from entering into the armature housing through the opening.

16. The motor system of claim 15, wherein the repeller includes a plurality of vanes adjacent the opening in the armature housing.

17. The motor system of claim 16, wherein the vanes are straight and radially oriented with respect to the rotatable shaft.

18. The motor system of claim 16, wherein the vanes are curved.

19. The motor system of claim 15, wherein the armature housing includes an exterior surface having a depression formed adjacent the opening in the armature housing to accommodate the repeller.

20. The motor system of claim 15, wherein the armature housing includes an exterior surface having a protrusion that is perimetrically disposed about the opening, and wherein the protrusion and exterior surface define a depression adjacent the opening in the armature housing for accommodating the repeller.

21. The motor system of claim 15, further comprising at least one moisture detector disposed within the armature housing, the moisture detector adapted to detect when moisture within the armature housing exceeds a predetermined threshold.

22. The motor system of claim 15, further comprising a pump impeller operationally connected to the rotatable shaft.

23. The motor system of claim 15, further comprising a cooling device adapted to cool the main motor.

24. The motor system of claim 23, wherein the cooling device includes a cooling jacket for circulating fluid around the main motor.

25. The motor system of claim 23, wherein the cooling device includes a cooling fan rotationally mounted outside the mature housing and adapted so that, when rotated, the cooling fan creates an airflow for cooling the main motor, the motor system further comprising a torque-limiting device to reduce drag created by the cooling fan when the motor system is operated in an at least partially immersed condition.

26. The motor system of claim 25, further comprising a fan motor operationally connected to the cooling fan for driving the cooling fan.

27. The motor system of claim 26, wherein the torque-limiting device includes a switching device adapted to shut the fan motor off when the motor system is operated in an at least partially immersed condition.

28. The motor system of claim 25, wherein the cooling fan is operationally connected to the main motor, and wherein the torque-limiting device includes a shear key operationally connected between the cooling fan and the main motor.

29. The motor system of claim 25, wherein the cooling fan is operationally connected to the main motor, and wherein the torque-limiting device includes a clutch operationally connected between the cooling fan and the main motor.

30. The motor system of claim 25, wherein the cooling fan includes a fan blade made of a resilient material, the fan blade comprising the torque-limiting device.

31. An immersible pump system, comprising:
   a main motor operable in an immersed condition and a non-immersed condition including an armature enclosed within a housing and a rotatable shaft that extends out of the armature housing through an opening in the armature housing;
   an impeller connected to the rotatable shaft, the impeller being driven by the main motor;
   a repeller mounted to the rotatable shaft outside the armature housing and near the opening, the repeller being adapted so that, when rotated, the repeller repels fluid and other contaminants to prevent contamination from entering into the armature housing through the opening;
   a cooling fan rotationally mounted outside the armature housing and adapted so that, when rotated, the cooling fan creates an airflow for cooling the main motor; and
   a torque-limiting device to reduce drag created by the cooling fan when the immersible pump system is operated in an at least partially immersed condition.

* * * * *